Raffensparger & Grochnauer,

Seed Sower.

No. 98,413. Patented Dec. 28, 1869.

Witnesses
F. Lehmann
C. L. Suess

Inventor
Amos Raffensparger
D. G. S. Grochnauer
per Alexander Mason
Atty.

United States Patent Office.

AMOS RAFFENSPARGER AND D. G. S. GOCHNAUER, OF MULBERRY, PENNSYLVANIA.

Letters Patent No. 98,413, dated December 28, 1869.

IMPROVEMENT IN SEED-SOWERS.

Schedule referred to in these Letters Patent and making part of the same.

*To all whom it may concern:*

Be it known that we, AMOS RAFFENSPARGER and D. G. S. GOCHNAUER, of Mulberry, in the county of York, and in the State of Pennsylvania, have invented new and useful Improvements in Seed-Sowers; and do hereby declare that the following is a full, clear, and exact description thereof, reference being had to the accompanying drawings, and to the letters of reference marked thereon.

The nature of our invention consists in the construction and general arrangement of a hand seed-sower, which will register the amount of seed sown.

In order to enable others skilled in the art to which our invention appertains to make and use the same, we will now proceed to describe its construction and operation, referring to the annexed drawings, in which—

Figure 1:
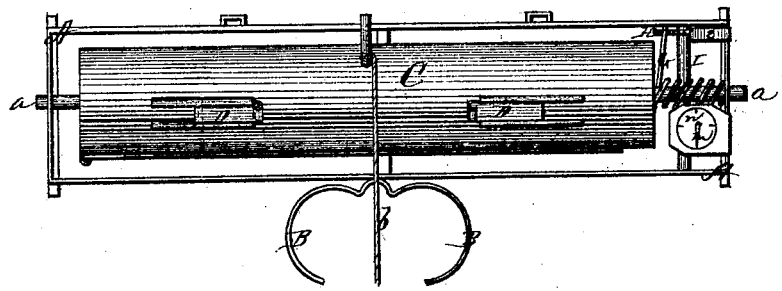
Figure 1 is a plan view.
Figure 2:
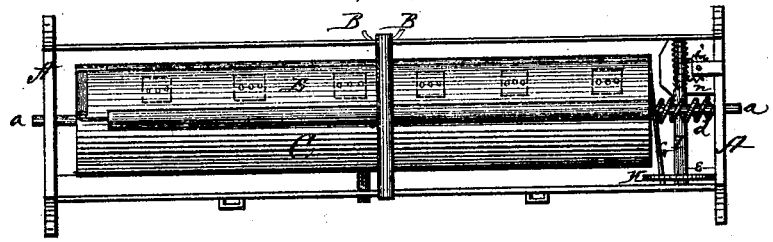
Figure 2 is a bottom view.

A represents a frame, of suitable dimensions, having in the centre of one side two springs B secured to it, which springs are fastened around the waist of the operator.

A strap, which we have not deemed it necessary to represent in the drawings, is also secured to said frame, and passed over the neck of the operator.

In the ends of the frame A, a cylinder, C, has its bearings, said cylinder being provided with rods or pivots $a\ a$, one at each end, which pass through the ends of the frame.

The cylinder C is made of any suitable size or dimensions, of sheet-metal, and on one side provided with apertures, through which the seed is put in, and said apertures closed by slides D D.

On the opposite side of the cylinder is a slide, E, running the whole length of the cylinder, said slide being provided with a number of small holes, divided into sections, which will correspond with square holes cut out of the cylinder, so that when the slide E is drawn one way, the holes in the slide will not be opposite the holes in the cylinder, and consequently, not drop any seed, but by pushing the slide back again it will open one, two, or more holes.

On the centre of the cylinder a string or strap, $b$, is attached, by means of which the operator is enabled to revolve the cylinder half-way.

A spring, $d$, attached to one of the pinions or axles $a$, brings the cylinder back again to its first position.

On one end of the cylinder C is an arm, G, which, when the spring $d$, as above mentioned, brings the cylinder back to its first position, strikes the ratchet-wheel H, turning the same the distance of one of its teeth, said ratchet-wheel being secured on a screw-rod, I, which has its bearings in the sides of the frame A, near one end.

A spring, $e$, is placed so as to catch in the teeth on the ratchet-wheel H, and prevent the same from turning backward.

The screw-rod I gears with a small pinion, $i$, on a vertical shaft, which is provided with a hand or finger, $m$, on the upper side of a dial-plate, $n$, by which means the operator can at a glance see how much seed has been sown, he, of course, knowing how much seed passes through the holes at each motion of the cylinder.

An indicator may be attached to any seed-sower, to show the amount sown.

Having thus fully described our invention,

What we claim as new, and desire to secure by Letters Patent, is—

1. The combination of the frame A, springs B B, cylinder C, pivots $a\ a$, spring $d$, and cord or strap $b$, all substantially as and for the purposes herein set forth.

2. The arrangement of the arm G, ratchet-wheel H, screw-rod I, pinion $i$, and indicator $m\ n$, all substantially as and for the purposes herein set forth.

3. The combination and arrangement of the frame A, springs B B, cylinder C, pivots $a\ a$, spring $d$, arm G, ratchet-wheel H, screw-rod I, pinion $i$, and indicator $m\ n$, all constructed as described, and operating substantially in the manner and for the purposes herein set forth.

In testimony that we claim the foregoing, we have hereunto set our hands, this 6th day of April, 1869.

AMOS RAFFENSPARGER.
D. G. S. GOCHNAUER.

Witnesses:
DAVID G. DEARDORFF,
C. L. EVERT.